Patented Dec. 7, 1948

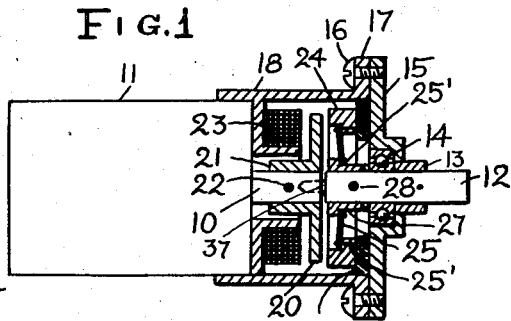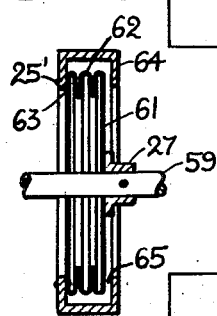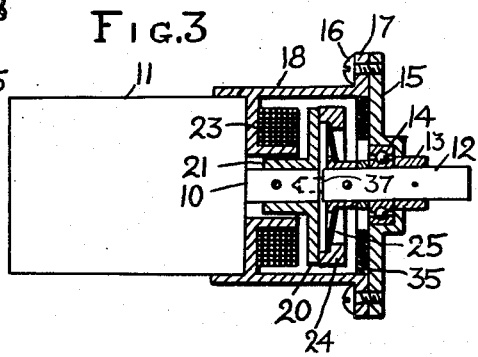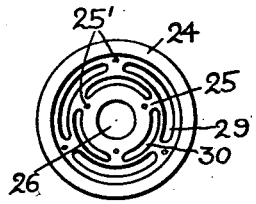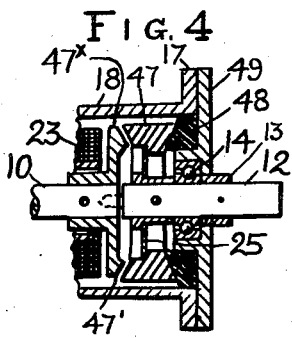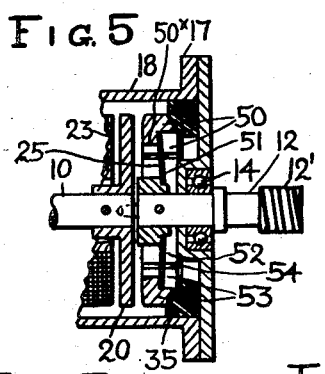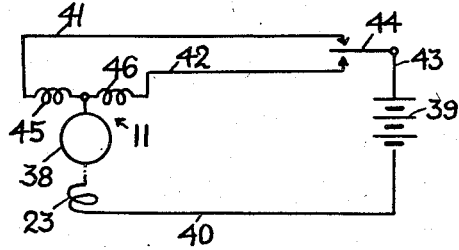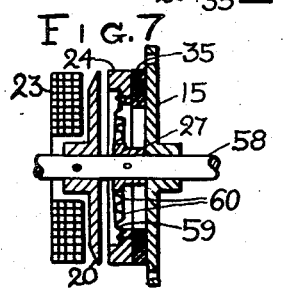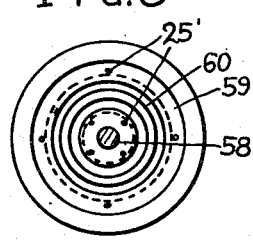

2,455,900

UNITED STATES PATENT OFFICE 2,455,900

COMBINED CLUTCH AND BRAKE

Michel N. Yardeny and Leon Kardorff, New York, N. Y.; said Kardorff assignor to said Yardeny Application December 16, 1944, Serial No. 568,435

3 Claims. (Cl. 192—14)

1

This invention relates to transmissions between a driving member, as the shaft of an electric motor, and a driven member, as another shaft to be clutched to the driving member and to be unclutched therefrom and braked when desired for quick stopping incidental to unclutching the two members.

A feature of the invention is to provide an improved combination of parts comprising magnetically operated clutch means for coupling the driving and driven members and operable to effectiveness and ineffectiveness at will, and a mechanically operating brake means for the driven member rendered operative in response to the clutch means being rendered ineffective. However it should be noted that either clutch or brake means alone could be used.

Another feature of the invention is the provision of means whereby a combination operating as above explained can be provided in which relative movement between the clutch parts to render the clutch effective or ineffective may occur without imparting an accompanying movement to the driven member. In previous arrangements of the kind to which the invention relates, the disadvantage just referred to has been present. The result is that the driven shaft during clutch operation moves axially, and this axial movement prevents the use of worm gears or similar gear transmissions. This disadvantage is especially serious when a worm and a worm gear couple are used. Even with a spur gear train driven from a driven shaft, axial movement of the latter causes sooner or later such wear that the shaft develops lateral play or wobble, and this is undesirable even in the case of spur gears because developing lost motion, backlash, etc. Such lost motion is particularly objectionable in precision apparatus. For long continued precise operation of the driven member, it should be prevented from having any movement or movements other than the movement or movements which it is designed to perform in response to its coupling to the driving member after the clutch has been rendered effective by the clutch parts having completed relative movement between them.

This feature of the invention is probably of maximum value where the driving member is a driving shaft and the driven member is a driven shaft axially aligned with the driving shaft; and in exemplification of the invention a now favored embodiment thereof for use with two shafts so arranged is illustrated and described herein.

Another important feature of the invention re-

2 sides in the provision of means for supporting the clutch and brake element solely by a spring means which in turn is fixed to one of the members. Such an arrangement has the important advantage of eliminating completely all play in and between moving parts.

A further feature of the invention is the provision of means so arranged that centrifugal force acts to improve the braking action by speeding up the same and increasing the power thereof when, incidental to rendering the clutch ineffective, the brake is rendered effective, and to accelerate the unclutching action when the clutch is rendered ineffective.

The invention itself, and the above and other features and advantages thereof will be pointed out or become apparent in the course of the following description of the exemplifying embodiment shown in the accompanying drawing, in which:

Fig. 1 is an axial sectional elevational view of a combined clutch and brake in a now preferred form according to the invention, mounted at the end of an electric motor, and showing the clutch member in an inoperative position;

Fig. 2 is a detail view of a clutch spring;

Fig. 3 is a sectional view of the clutch, showing the clutch member in an operative position;

Fig. 4 is a fractional sectional view of a modified clutch;

Fig. 5 is a similar view of another modification in which the clutch member is so constructed as to be affected by centrifugal force;

Fig. 6 is a diagram of connections of the clutch magnet when used with a motor;

Fig. 7 is a fractional sectional view showing the use of the invention as a brake without the clutching feature; this figure also illustrates an alternate form of spring;

Fig. 8 is a front view of the brake ring and spring of Fig. 7;

Fig. 9 is a fractional sectional view of a modified form of clutch ring and spring.

Referring to the form of the invention illustrated in Fig. 1, the driving member is shown as the shaft 10 of an electric motor 11, which motor may be of any size or type desired and suitable for the use intended.

A driven shaft 12 is shown as aligned with the motor shaft 10, and mounted on an antifriction bearing 14 carried by an end plate 15 secured by machine-screws 16 to an external annular flange 17 at the forward end of a casing 18. Bearing 14 is fitted in an annular recess formed in the rear portion of end plate 15. A collar 13 is secured to or integrally formed with the shaft 12, for preventing an axial movement of the same.

Housed within the casing 18, which casing is suitably secured to the motor casing or otherwise fixed against movement relative to the motor shaft, are the clutch and brake parts.

A disc 20 is formed integral with a collar or sleeve 21 and fastened to the motor shaft 10 as by a pin 22. The disc is made of a magnetic material, and the sleeve 21 serves as a core of a magnet coil 23 fitted in an inner recess of the casing 18. The disc 20 serves as a magnetic pole for attracting a clutch ring 24, also made of a magnetic material. The ring 24 is mounted on a disc-shaped spring 25 shown more in detail in Fig. 2. The spring has a central opening 26 for a collar 27, secured on the shaft 12 as by a pin 28. Collar 27, and ring 24, are secured to the spring 25, by suitable means such as by rivets 25'. The spring 25, to increase its resiliency and flexibility may be provided with several staggered slots 29, 30. The collar 27 is so positioned on the shaft 12 that the disc 25, which normally is of the cup shape shown in Fig. 1, is then sprung away from the magnet coil and the disc 20, thereby causing the ring 24 to engage a friction disc 35, attached to the inner side of the end plate 15. The friction disc 35 is preferably made of cork or similar frictional material.

The shaft 12 is provided with an extension 37 of reduced diameter, rotatably fitted in a corresponding hole in the end of the motor shaft 10 for maintaining axial alignment of the two shafts.

When the clutch ring 24 is as above normally spaced from the disc 20, for engaging the friction disc 35, the shaft 12 is disengaged from the motor shaft 11 and is braked by the friction between the outer face of the ring 24 and the disc 35.

The magnet coil 23 is preferably connected in series with the armature 38 of the motor 11, as shown diagrammatically in Fig. 6, and in series with a source of current 39 by a lead 40 at one side, and leads 41, 42, 43 at the other side, with a two-way switch 44 for connecting the motor armature through one or the other of field windings 45, 46. Such an arrangement is advantageous when it is desired to rotate the motor in either of two directions, and at the same time to render the clutch effective. It is understood, of course, that the magnet coil 23 can be also connected in parallel with the motor, or in any other suitable manner.

When the motor and the magnet coil 23 are energized, the disc 20 is magnetized, acting as a pole of a magnet, attracting the clutch ring 24 against the resistance of the spring 25. The ring 24 will then engage the disc 20, so that these parts will rotate as a unit, thereby coupling the driven shaft 12 to the motor shaft 11, as shown in Fig. 3.

The frictional engagement of the clutch ring may be increased, especially when its diameter is limited, by providing the clutch ring with outwardly flared sides as shown in Fig. 4. The clutch ring 47 is beveled at both sides, the outer side engaging a correspondingly beveled side of a frictional ring 48 mounted at the inner side of an end plate 49 and the innerside of the clutch ring 47 engaging the correspondingly beveled side of a magnetic disc 47'. It will be noted from Fig. 4 that the clutch ring 47 is flared rather than tapered outwardly. The purpose of so orienting the beveled sides of the ring is to cause the complementary beveled side of the magnetic disc 47' to assume the shape shown in Fig. 4, where it will be seen that the side of magnetic disc 47' tapers towards a narrow peripheral portion 47$^x$. It is desirable that the path of the magnetic flux of magnet coil 23 flow from casing 18, through clutch ring 47, over to the magnetic disc 47' and thus complete the path to casing 18 via sleeve 21. That is, as little as possible of the flux should by-pass clutch ring 47 by passing from casing 18 directly to magnetic disc 47'. It is for this reason that disc 47' is tapered as described to present only a restricted peripheral portion 47$^x$ to the casing 18, and so that the clutch ring 47, on the other hand, will present a considerable surface thereto.

A more rapid disengagement of the clutch ring from magnetic disc 20 and its more rapid engagement with the friction disc 35 may be effected by the action of centrifugal force. Such an arrangement is shown in Fig. 5 wherein the clutch ring is not a solid or continuous ring as in the previous figures but is divided into a plurality of segments 50, 51, 52, 53, separated from one another by short gaps 54. The segment portions are individually fastened to spring 25 at spaced points around the same. The segment portions have a radially inwardly directed flange 50$^x$ which is disposed on the side of spring 25 facing the magnet disc 20; by reason of their flanges 50$^x$ the segment portions are relatively heavier on the side of the spring facing the magnetic disc. Hence, when the clutch is engaged and the clutch ring rotated, an unbalanced bending movement is created by centrifugal force which tends to move the clutch ring toward the right as viewed in Fig. 5, so that upon deenergization of the motor, the clutch ring is rapidly unclutched from magnetic disc 20 and is rapidly braked by the friction disc 35; also the action of centrifugal force in the ring segments as explained above increases the braking action between the ring and the friction disc.

Shaft 12 may support a worm 12' used for operating a load.

Fig. 7 shows the use of the invention as a brake alone, i. e., without the clutching elements. In this case, both the magnetic disc 20 and the collar 27, to which brake ring 24 is fastened, are both secured to the motor shaft 58. Spring 59, which will be more fully described below, is, as in the previous figures, biased toward brake ring 35, so that ring 24 is under urgency to move into braking engagement with 35. When current is supplied to the motor, magnetic coil 23 is energized to attract the said ring 24 away from the brake ring 35 and permit free rotation of the motor.

A modified form of disc-like spring is shown in Fig. 8, in which, instead of providing perforations (such as 29, Fig. 2), flexibility is imparted to the spring by a number of corrugations 60 concentrically disposed in the disc which constitutes spring 59. Another form of spring employing corrugations for flexibility is shown in Fig. 9, wherein the spring 61 is in the form of a shallow cylinder open at one end, which is secured at its closed end to collar 27. The cylindrical surface of the spring is provided with corrugations 62, making the spring a bellows-like structure in appearance and operation. The clutch ring 64 is conveniently of channel section, as shown, in the annular space of which is disposed the bellows or corrugations 62. One flange of the channel ring 64, such as the left flange 63, Fig. 9, is secured to the open end of the corrugated cylindricallyshaped spring, so that the clutch ring is supported by the spring in a "floating" condition. The spring is biased by its corrugations to urge the clutch ring in the desired direction, which is for convenience shown towards the left in Fig. 9. Sufficient clearance, indicated at 65, is provided between the spring and the right flange of channel ring 64, to permit leftward movement of 64. Energization of the magnetic coil (not shown in Fig. 9) will attract clutch and/or brake ring 64 towards the right, compressing the bellows or corrugations (which is the condition in which the spring is shown in Fig. 9).

We claim:

1. A combined clutch and brake comprising, in combination, a driving shaft; a driven shaft in concentric extension of the driving shaft; a casing arranged to be fixedly supported relative to both shafts and shaped interiorly to provide a chamber surrounding adjacent end portions of both shafts; a pair of cooperating clutch members, one secured to the driving shaft and the other to the driven shaft; an electromagnet; braking means carried by the casing; and means in the chamber for resiliently mounting one of said clutch members on and spaced around the shaft to which it is secured, the last-named clutch member constructed to constitute an armature for the electromagnet when energized and the mounting means being resiliently biased whereby such energization moves the resiliently mounted clutch member against such bias into clutch engagement with the other clutch member, the mounting means also being arranged to urge the resiliently mounted clutch member into engagement with the braking means for rendering the latter effective when the magnet is deenergized, the mounting means being arranged annularly around the respective shaft, and the clutch member mounted thereby being annularly discontinuous around the mounting means, portions of the discontinuous clutch member facing the electromagnet having a greater mass than the clutch portions facing the braking means.

2. A combined clutch and brake comprising, in combination, a driving shaft; a driven shaft concentric with the driving shaft; a pair of cooperating clutch devices secured respectively to the driving shaft and to the driven shaft; an electromagnet which when energized moves the clutch devices relatively to each other to establish clutch engagement therebetween; a braking device; and a resilient means acting on one of the clutch devices for urging that clutch device away from engagement with the other clutch device and into engagement with the braking device on deenergization of the electromagnet, one of the clutch devices including several clutch members peripherally spaced apart, these members being secured to the resilient means and responsive to centrifugal force, the last-named members and the resilient means being so shaped and arranged that when responsive to energization of the electromagnet both clutch devices are brought into engagement and when responsive to centrifugal force their relative movement away from engagement is accelerated on deenergization of the electromagnet.

3. A combined clutch and brake comprising, in combination, a driving shaft; a driven shaft in concentric extension of the driving shaft; a casing arranged to be fixedly supported relative to both shafts and shaped interiorly to provide a chamber surrounding adjacent end portions of both shafts; a pair of cooperating clutch members, one secured to the driving shaft and the other to the driven shaft; an electromagnet; braking means carried by the casing; and means in the chamber for resiliently mounting one of said clutch members on and spaced around the shaft to which it is secured, the last-named clutch member being of an annular shape and formed of a plurality of members attached to the mounting means and constructed to constitute an armature for the electromagnet when energized, the mounting means being resiliently biased whereby energization of the magnet moves the resiliently mounted clutch member against such bias into clutch engagement with the other clutch member, the mounting means also being arranged to urge the resiliently mounted clutch member into engagement with the braking means for rendering the latter effective when the magnet is deenergized, the mounting means being arranged annularly continuous around the respective shaft and interrupted by a plurality of spaced apertures, the annular clutch member having a relatively greater mass at the side of the mounting means facing the electromagnet than the clutch portions facing the braking means, whereby the centrifugal force produced by the rotation of the shafts tends to urge the annular clutch member away from the electromagnet, thereby accelerating the release of the clutch when the magnet is deenergized.

MICHEL N. YARDENY.
LEON KARDORFF.

REFERENCES CITED

The following references are of record in the file of this patent:

UNITED STATES PATENTS

| Number | Name | Date |
| --- | --- | --- |
| 1,255,724 | Fend | Feb. 5, 1918 |
| 1,523,413 | Gent | Jan. 20, 1925 |
| 1,571,746 | Wemp | Feb. 2, 1926 |
| 2,078,130 | Edwards | Apr. 20, 1937 |
| 2,098,266 | Walker | Nov. 9, 1937 |
| 2,120,734 | Cotal | June 14, 1938 |
| 2,242,518 | Fodor | May 20, 1941 |
| 2,315,298 | Thompson | Mar. 30, 1943 |